United States Patent
Tsuchiya

(10) Patent No.: US 6,340,076 B1
(45) Date of Patent: *Jan. 22, 2002

(54) VEHICULAR DISK BRAKE

(75) Inventor: Takenori Tsuchiya, Nagano (JP)

(73) Assignee: Nissin Kogyo Co., Ltd., Nagano (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/399,165

(22) Filed: Sep. 20, 1999

(30) Foreign Application Priority Data

Sep. 24, 1998 (JP) .......................... 10-270051
Sep. 28, 1998 (JP) .......................... 10-272817

(51) Int. Cl.$^7$ ............................. F16D 65/14
(52) U.S. Cl. ................. 188/73.45; 188/71.1; 188/73.39
(58) Field of Search .................. 188/18 A, 72.4, 188/73.45, 73.1, 73.39, 73.46, 71.1

(56) References Cited

U.S. PATENT DOCUMENTS

| | | | |
|---|---|---|---|
| 4,823,920 A | * 4/1989 | Evans ...................... | 188/73.34 |
| 4,881,623 A | 11/1989 | Kondo | |
| 5,060,766 A | * 10/1991 | Kondo ..................... | 188/73.39 |
| 5,129,487 A | * 7/1992 | Kobayashi ................ | 188/73.1 |
| 5,657,837 A | * 8/1997 | Yamadera ................ | 188/73.45 |
| 5,931,267 A | * 8/1999 | Iwata ...................... | 188/73.45 |
| 6,062,349 A | * 5/2000 | Boisseau et al. ......... | 188/73.45 |
| 6,135,245 A | * 10/2000 | Gautier .................... | 188/73.45 |
| 6,135,246 A | * 10/2000 | Kurasako ................. | 188/73.45 |
| 6,161,658 A | * 12/2000 | Becocci .................... | 188/71.8 |
| 6,182,801 B1 | * 2/2001 | Yoshida et al. .......... | 188/73.45 |

FOREIGN PATENT DOCUMENTS

| | | |
|---|---|---|
| DE | 31 41 598 A1 | 10/1982 |
| DE | 197 44 270 A1 | 5/1998 |
| GB | 2028940 | * 3/1980 |
| GB | 2 311 107 A | 9/1997 |
| JP | 58-118326 | 8/1983 |
| JP | 10-110755 | 4/1998 |

\* cited by examiner

*Primary Examiner*—Donald P. Walsh
*Assistant Examiner*—David Divine
(74) *Attorney, Agent, or Firm*—McGuireWoods LLP

(57) ABSTRACT

The protrusion 14*d* of a friction pad 8 on a reacting portion side is fitted in the fitting hole 4*g* of the reacting portion 4*b* on the rotor-in side, whereas the rotor-out side of the friction pad 8 is supported by the torque-receiving stepped portion 3*h* of a caliper bracket 3. The pad assembling pieces and 17*b* of the pad spring 17 secured to the acting portion 8 are brought into resilient contact with reaction pawls 4*e* and 4*f* on the outer surface, and the inside and outside of the reaction pawls 4*e* and 4*f* are held between the back plate 14 of the friction pad 8 and the pad assembling pieces and 17*b* so as to fit the friction pad 8 to the reacting portion 4*b*. The contact piece 17*e* of the spring piece 17*c* is brought into resilient contact with the upper bottom wall of a piston receiving recess 24 in order to urge a caliper body 4 outwardly in the radial direction of a disk whereas to urge the friction pad 8 inwardly in the radial direction of the disk.

18 Claims, 11 Drawing Sheets

VEHICULAR DISK BRAKE

BACKGROUND OF THE INVENTION

1. Field of the Invention

This invention relates to a disk brake to be mounted on a vehicle such as an automobile, motorcycles with two tandem and sometimes three rubber wheels, and more particularly to a vehicular disk brake using a pin slide type caliper body.

Japanese Patent Unexamined Publication No. Hei. 10-110755 and Japanese Utility Model Unexamined Publication No. Sho.58-118326, for example, disclose vehicular disk brakes using a pin slide type caliper body.

In these disk brakes, a pin slide type caliper body has been employed wherein the caliper body for coupling acting and reacting portions on the respective sides of a bridge portion is cantilevered with a caliper bracket fixed to one side of a disk rotor in a vehicle body via a pair of slide pins so that the caliper body may be slid in the axial direction of a disk under the guidance of the slide pins. When the brake is applied, the caliper body is slid in the axial direction of the disk and a pair of friction pads located at both sides of the disk rotor are pushed against the disk rotor by the acting and reacting portions of the caliper body, so as to bring the linings of both the friction pads into slidable contact with the respective sides of the disk rotor, whereby the braking operation is performed.

In Japanese Patent Unexamined Publication No. Hei.10-110755, the friction pad on the acting portion side is retained by the pad receiving portion of the caliper bracket on the rotor-in and rotor-out sides. The friction pad on the reacting portion side is provided such that a pair of protrusions on the back surface of a back plate are fitted in the respective fitting holes bored in reaction pawls on the rotor-in and rotor-out sides of the reacting portion. Further, both ends of a bar-shaped pad spring fitted to a protrusion in the center of the back of the back plate is retained on the inner peripheral disk side of the reaction pawls, so that the friction pad on the reacting portion side may be supported by the reacting portion of the caliper body. This structure has thus been attempted to reduce the caliper bracket in size and weight.

With the arrangement mentioned above, since the caliper body is of the cantilevered type in which only the acting portion side is supported to the caliper bracket, the braking torque generated in the friction pad on the acting portion side is directly and rotatably supported to the caliper bracket having greater supporting rigidity. However, the braking force generated in the friction pad on the reacting portion side acts on the reacting portion of the caliper body separated from the caliper bracket.

The braking force applied in the direction in which a vehicle travels forward in particular is considerably greater than the braking force applied in the direction in which the vehicle moves backward, and this results in the behavior of the caliper body toward greatly bending the reacting portion in the direction of the rotor-out side of the disk. Accordingly, there is the possibility of damaging the sliding properties of the caliper body or of causing offset wear to the lining because of the offset hitting of the one-side lining of the friction pad against the side of the disk rotor. If the thickness of the reaction pawls is increased to raise the rigidity of the reacting portion side so as to solve the aforementioned problems, the caliper body will become greater in weight and size, which will lose the effect of reducing the caliper bracket in size and weight.

Moreover, on the reacting portion side of the caliper body, the fitting of the protrusions into the fitting holes is employed when the friction pads are assembled. At least one of the fitting holes of the reacting portion side thereof is formed so that its diameter is set greater than that of the protrusion in order to facilitate the assembling of the friction pad by absorbing manufacturing errors. Consequently, the friction pad on the reacting portion side is dragged in the direction of the rotor-in side of the disk to the extent of the gap between the fitting hole and the protrusion at the time of applying the brake, which will incur a brake judder as well as a vibration judder. Although the pad spring is useful for moderating the interference of the caliper body with the friction pad on the reacting portion side due to the travel vibration of the vehicle, the vibration of the caliper body and the friction pad itself cannot be suppressed, which causes the protrusions to pry open the fitting holes, thus hastening the wear of the latter or producing the incurred backlash sound.

Further, the friction pad on the reacting portion side is needed to be temporarily fitted to the reacting portion before the caliper body is assembled with the vehicle body in the disk brake. However, because the friction pad on the reacting portion side is not kept in engaging relation to the caliper bracket, the friction pad on the reacting portion side may easily slip off the reacting portion when the external force directed to the acting portion is applied to the friction pad fixedly retained by the reacting portion during the work of incorporating the caliper body with the vehicle body.

In Japanese Utility Model Unexamined Publication No. Sho.58-118326, the friction pad on the reacting portion side is such that a pair of protrusions on the back of a back plate are fitted in the respective fitting holes bored in reaction pawls on the rotor-in and rotor-out sides of the reacting portion. Lugs protruded on the rotor-in and rotor-out sides of the back plate of the friction pad on the reacting portion side are retained by the caliper bracket, and both ends of a bar-shaped pad spring secured to the center of the back of a back plate are retained by the backs of reaction pawls, so that each of the friction pads on the reacting portion side is made to fixedly engage with the reacting portion of the caliper body.

In this disk brake, the installation of the pad spring causes a reaction to act on the reacting portion of the caliper body from the friction pad on the reacting portion side engaging with the caliper bracket, whereupon the acting portion side of the caliper body tilts inwardly in the radial direction of the disk, whereas the reacting portion side thereof tilts outwardly in the radial direction of the disk.

In consequence, the sliding properties of the caliper body may be impaired and an irregular gap may be produced between the back of the back plate of the friction pad and a piston in the acting portion or the reaction pawl in the reacting portion. Thus, the rise of initial braking force is delayed, and the lining of the friction pad is tilted toward the side of the disk rotor and further pressed thereagainst, so that the partial wear of the linings and a brake judder may be generated.

SUMMARY OF THE INVENTION

A first object of the present invention made with the foregoing actual situation is to provide a vehicular disk brake wherein excellent sliding properties of a caliper body is maintained by preventing the deformation of the caliper body due to braking torque as much as possible while attempting to reduce the caliper body and a caliper bracket in size and weight whereby to make the vehicular disk brake capable of suppressing partial wear of the linings of friction pads, vibrations of the friction pads and generation of a brake judder to the utmost.

In addition, a second object of the present invention is to provide a vehicular disk brake wherein a backlash of a caliper body in a reacting portion with respect to a friction pad on the reacting portion side is suppressed as much as possible to ensure that the friction pad on the reacting portion side is easily and certainly fabricated temporarily and wherein excellent sliding properties of the caliper body are maintained by restraining the caliper body from tilting whereby to make the vehicular disk brake capable of suppressing partial wear of linings as well as the generation of a brake judder therefrom.

To solve the above objects, according to the first aspect of the present invention, there is provided a vehicular disk brake, including: a disk rotor; a caliper bracket fixed to a vehicle body on one side of the disk rotor; a caliper body having an acting portion and a reacting portion which are disposed opposite to each other in both the respective side portions of the disk rotor, and a bridge portion coupling the acting portion and the reacting portion in such a manner as to stride over the outside of the disk rotor, the reacting portion of the caliper body having one of a protrusion and a fitting hole; a pair of slide pins provided in both ends of the caliper body in a radial direction of the disk rotor so that the caliper body is movably supported in an axial direction of the disk rotor; and a pair of friction pads oppositely disposed between the acting and reacting portions of the caliper body in such a manner that the disk rotor is intervened therebetween, the friction pad on a reacting portion side having the other of the protrusion and the fitting hole so as to fit with the reacting portion of the caliper body. The braking torque generated in the pair of friction pads in the direction in which a vehicle travels forward is rotatably supported by the caliper bracket, the braking torque generated in the friction pad on an acting portion side in the direction in which the vehicle moves backward is rotatably supported by the caliper bracket, and the braking torque generated in the friction pad on the reacting portion side in the direction in which the vehicle moves backward is rotatably supported by the reacting portion of the caliper body by fitting the protrusion to the fitting hole.

With the above structure, the braking force generated in the friction pad on the reacting portion side in the direction in which the vehicle travels forward is directly transmitted from the friction pad to the caliper bracket and is not transmitted to the reacting portion of the caliper body. Therefore, the caliper body can be slid smoothly in the axial direction of the disk and partial wear hardly occurs in the lining of the friction pad since the deflective deformation of the reacting portion due to the braking torque generated in the direction in which the vehicle travels forward is obviated in the caliper body. As the caliper bracket does not stride over the reacting portion side of the disk rotor on the rotor-in side while the vehicle is traveling forward, moreover, the caliper bracket can be made lightweight to that extent.

On the other hand, although the braking torque generated in the friction pad on the reacting portion side in the direction in which the vehicle moves backward is transmitted to the reacting portion of the caliper body via the protrusions and the fitting holes, the deflective deformation of the reacting portion is suppressed as much as possible because the braking torque generated in the direction in which the vehicle moves backward is smaller than what is generated in the direction in which the vehicle travels forward.

Further, the protrusion and the fitting hole may be disposed on a rotor-in side in a state that the vehicle is traveling forward. The friction pad on the reacting portion side on the rotor-out side is pressed by the braking torque generated in the direction in which the vehicle travels forward against the caliper bracket. Further, since the reacting portion of the caliper body is deflected by the rotational moment toward the rotor-out side, the protrusions on the rotor-in side are also pressed against the fitting holes. Therefore, the friction pad on the reacting portion side is restricted over a long span between the rotor-in and rotor-out sides and as the improper behavior of the friction pad is suppressed during the braking operation, the vibration of the friction pad and the generation of a brake judder on the reacting portion side are suppressed as much as possible. Since the improper behavior of the friction pad on the reacting portion side is thus suppressed, the improper behavior of the caliper body mated with the friction pad by means of the protrusion and the fitting hole is also suppressed.

Moreover, the fitting hole may be larger in diameter than the protrusion, and the fitting hole and said protrusion may be brought into contact with each other at an intersection point of a circle having a rotation center of the disk rotor as a fulcrum and passing through the center of the fitting hole, with a wall surface on the rotor-in side of the fitting hole in the state that the vehicle is traveling forward.

Since the braking torque generated in the friction pad on the reacting portion side in the direction in which the vehicle moves backward acts at the intersection point from the circumference passing through the center of the fitting hole in the tangential direction of the reacting portion of the caliper body, the friction pad is prevented from making an excessive movement and allows the braking torque in the direction in which the vehicle moves backward to be instantly transmitted to the reacting portion of the caliper body, whereby the initial braking force is raised quickly during the braking operation while the vehicle is moving backward. As the protrusions are restrained from prying open the fitting holes, these are also effectively prevented from being worn out as well as producing twisting sound.

According to the second aspect of the present invention, A vehicular disk brake, including: a disk rotor; a caliper bracket fixed to a vehicle body on one side of the disk rotor; a caliper body having an acting portion and a reacting portion which are disposed opposite to each other in both the respective side portions of the disk rotor, and a bridge portion coupling the acting portion and the reacting portion in such a manner as to stride over the outside of the disk rotor, the reacting portion of the caliper body having one of a protrusion and a fitting hole; a pair of slide pins provided in both ends of the caliper body in a radial direction of the disk rotor so that the caliper body is movably supported in an axial direction of the disk rotor; a pair of friction pads oppositely disposed between the acting and reacting portions of the caliper body in such a manner that the disk rotor is intervened therebetween, the friction pad on a reacting portion side having the other of the protrusion and the fitting hole so as to fit with the reacting portion of the caliper body, said protrusion and said fitting hole being disposed on a rotor-in side in a state that the vehicle is traveling forward; and a pad spring secured to a back plate of the friction pad on the reacting portion side, the pad spring having: a pad assembling piece bringing into resilient contact with an outside surface of the reacting portion so as to fit the friction pad of the reacting portion side to the reacting portion of the caliper body by interposing an inside and the outside surfaces of the reacting portion with the back plate of the friction pad of the reacting portion side and the pad assembling piece of the pad spring; and a spring piece resiliently pushing the friction pad on the reacting portion side and the caliper body in the radial direction of the disk rotor.

The protrusions on the rotor-in side are fitted in the respective fitting holes, so that the friction pad on the reacting portion side engages with the reacting portion and is temporarily assembled with the caliper body by holding the reacting portion internally and externally between the back plates and the pad assembling pieces of the pad spring. Consequently, the friction pad on the reacting portion side is prevented from slipping off the reacting portion at random when the caliper body is assembled with the vehicle body, and workability of assembling the caliper body is thus improved.

Since the rotor-out side of the friction pad on the reacting portion side is directly supported by the caliper bracket fixed to the vehicle body, the backlash of the caliper body in the reacting portion with respect to the friction pad on the reacting portion side is suppressed as much as possible due to the travel vibration of the vehicle with respective discrete oscillation frequencies in the radial direction of the disk. Thus, the protrusion is restrained from prying open the fitting hole with the effect of preventing these from being worn out.

As the spring piece of the pad spring resiliently urges the caliper body outwardly in the radial direction of the disk and the friction pad on the reacting portion side inwardly in the radial direction of the disk. The amount of movement acting on the caliper body from the spring piece of the pad spring outwardly in the radial direction of the disk remains within the clearance until the protrusion on the rotor-in side is brought into contact with the inner wall of the fitting hole. Therefore, the tilting of the caliper body due to the resilient force of the spring piece is suppressed to the minimum, whereby the partial wear of the lining as well as the brake judder is hardly produced without impairing the sliding properties of the caliper body.

In the above structure, the fitting hole may be a through-hole formed in the reacting portion of the caliper body and directed in the axial direction of the disk rotor, and an opening of the fitting hole formed in the outside surface of the reacting portion is covered with the pad assembling piece.

According to this structure, the fitting holes in combination with the respective protrusions for use in fitting the friction pad on the reacting portion side to the reacting portion of the caliper body may be through-holes passing through the reacting portion in the axial direction of the disk in view of moldability of the reacting portion and friction pads as well as post-machining workability. In this case, earth and sand, dust, moisture and the like are prevented from entering each of the fitting holes by covering the outer-surface opening of the fitting hole with the pad assembling piece of the pad spring. Moreover, the interior of the fitting hole is also prevented from being dried and caked with earth and sand and further fretted with rust.

DETAILED DESCRIPTION OF THE PREFERRED EMBODIMENTS

First Embodiment

Figure 1:
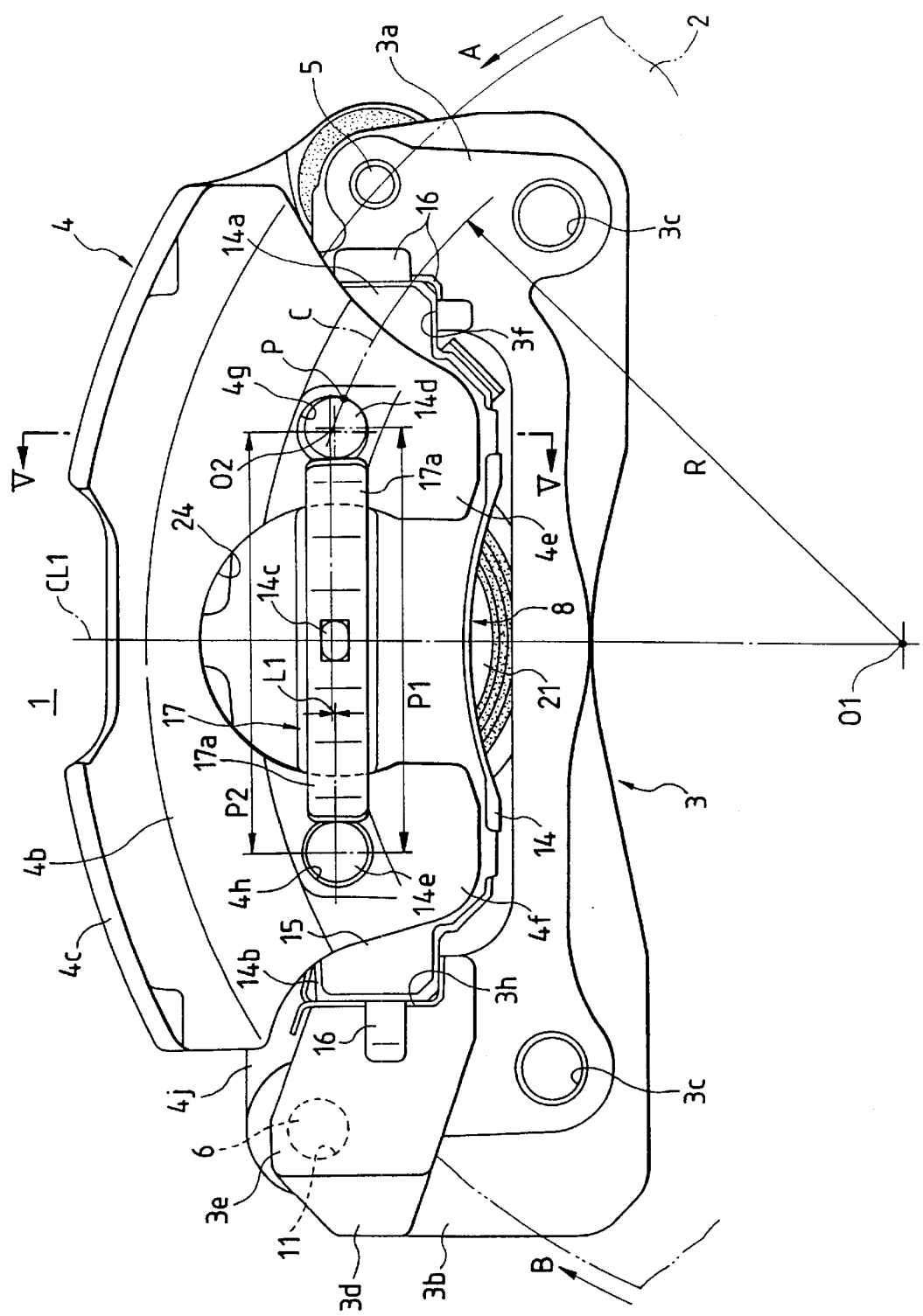
FIG. 1 is a rear view of a disk brake according to a first embodiment of the present invention.
Figure 2:
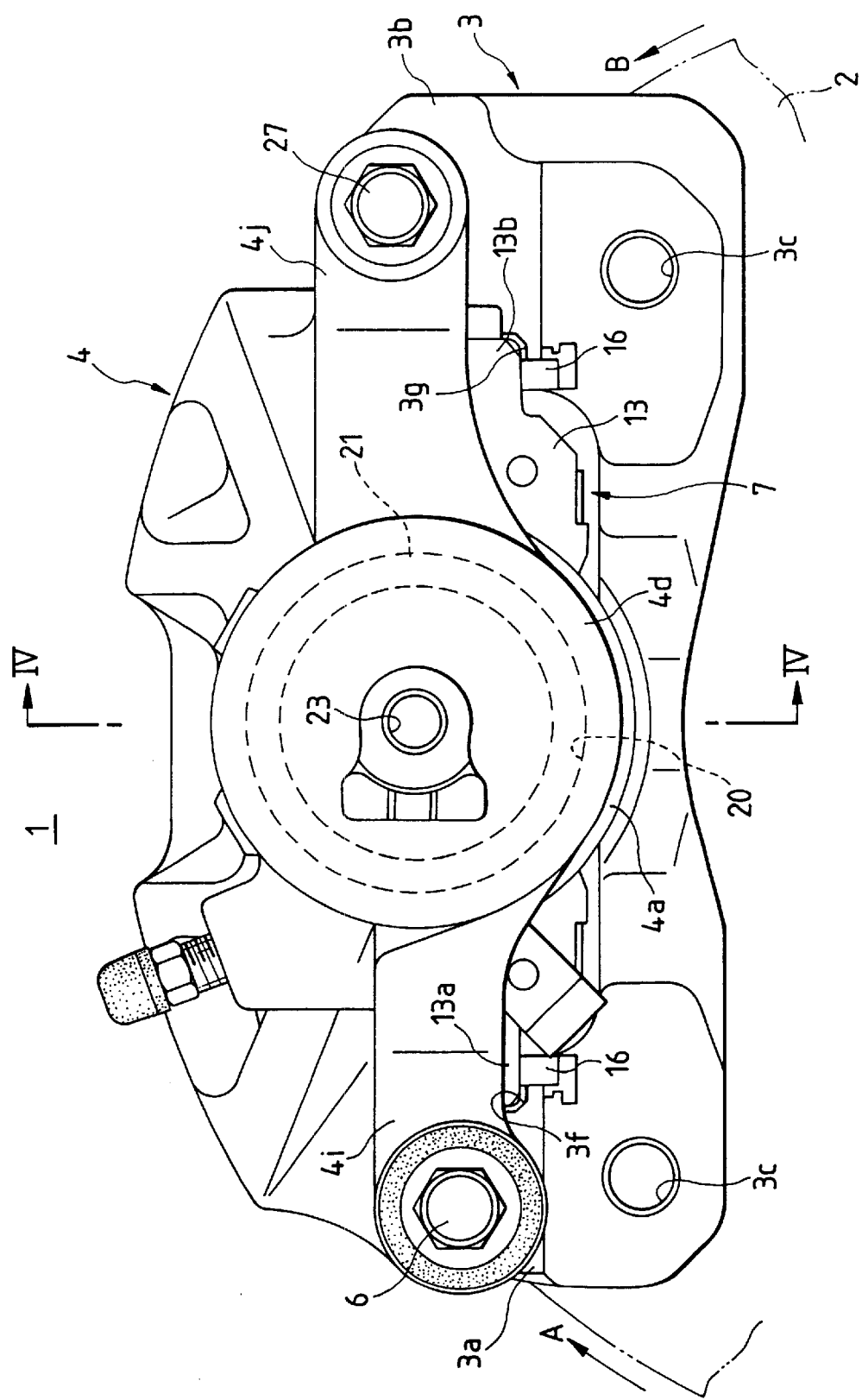
FIG. 2 is a front view of the disk brake according to the first embodiment.
Figure 3:
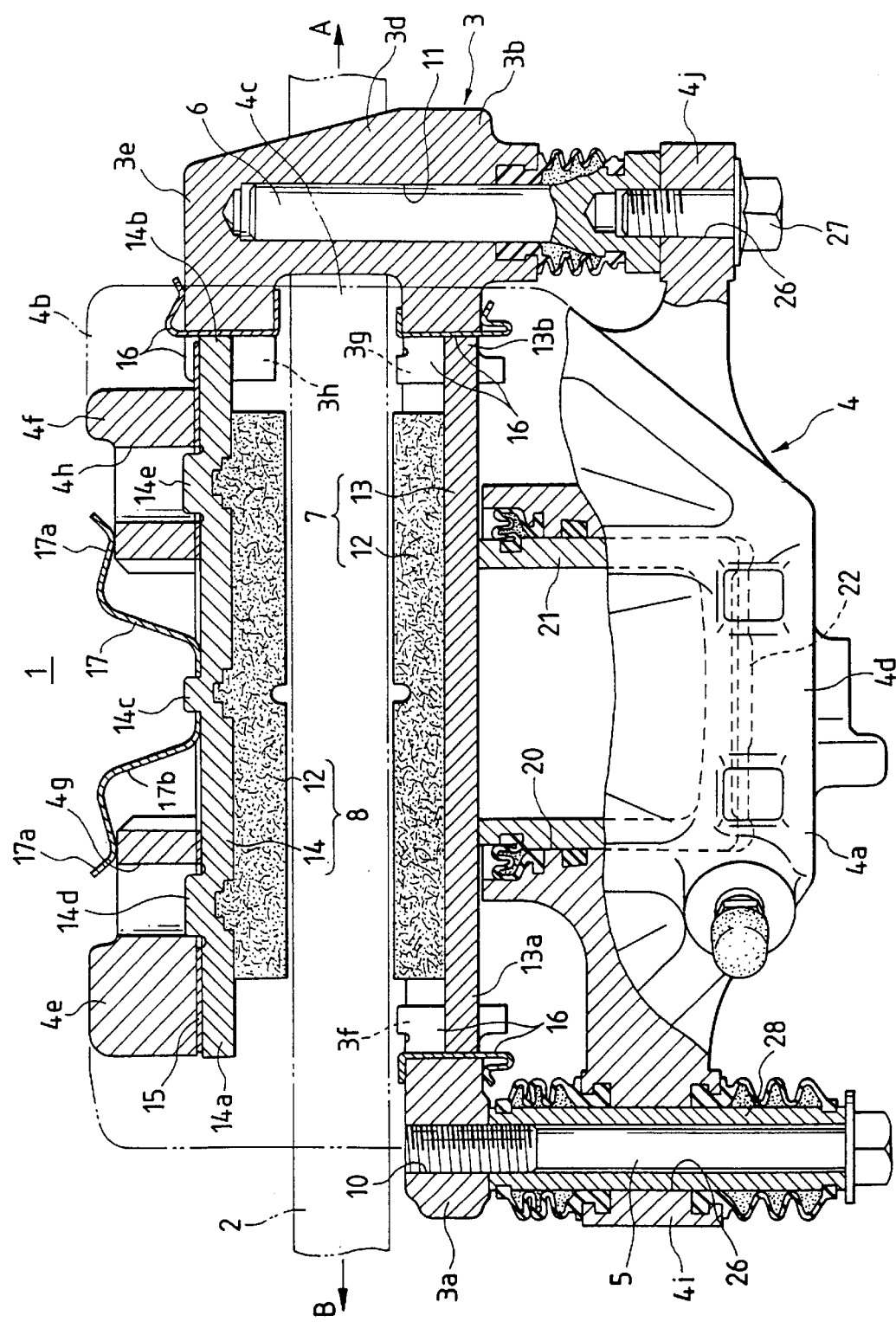
FIG. 3 is a sectional partial plan view of the disk brake according to the first embodiment.
Figure 4:
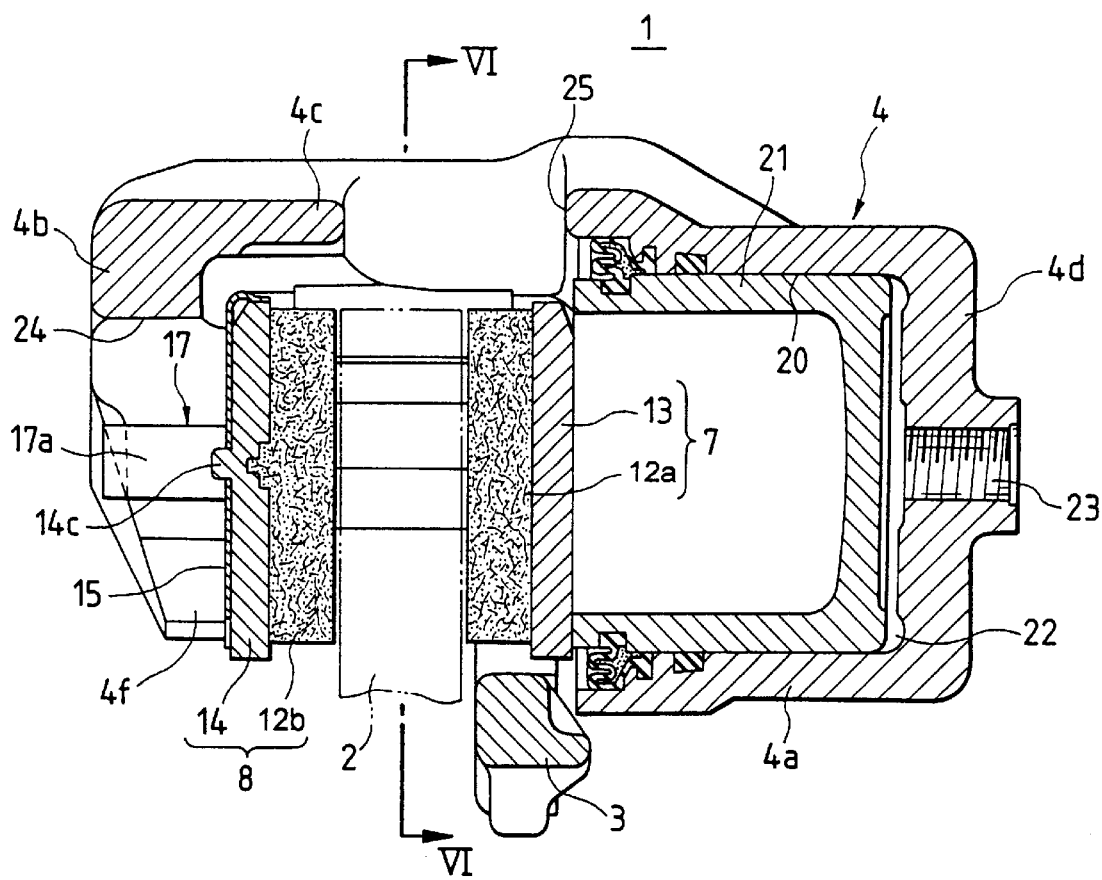
FIG. 4 is a sectional view taken on line IV—IV of FIG. 2.
Figure 5:
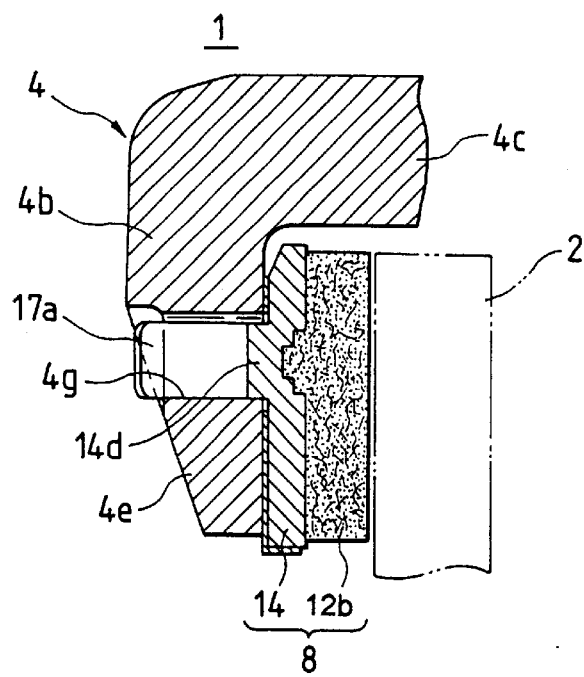
FIG. 5 is a sectional view taken on line V—V of FIG. 1.
Figure 6:
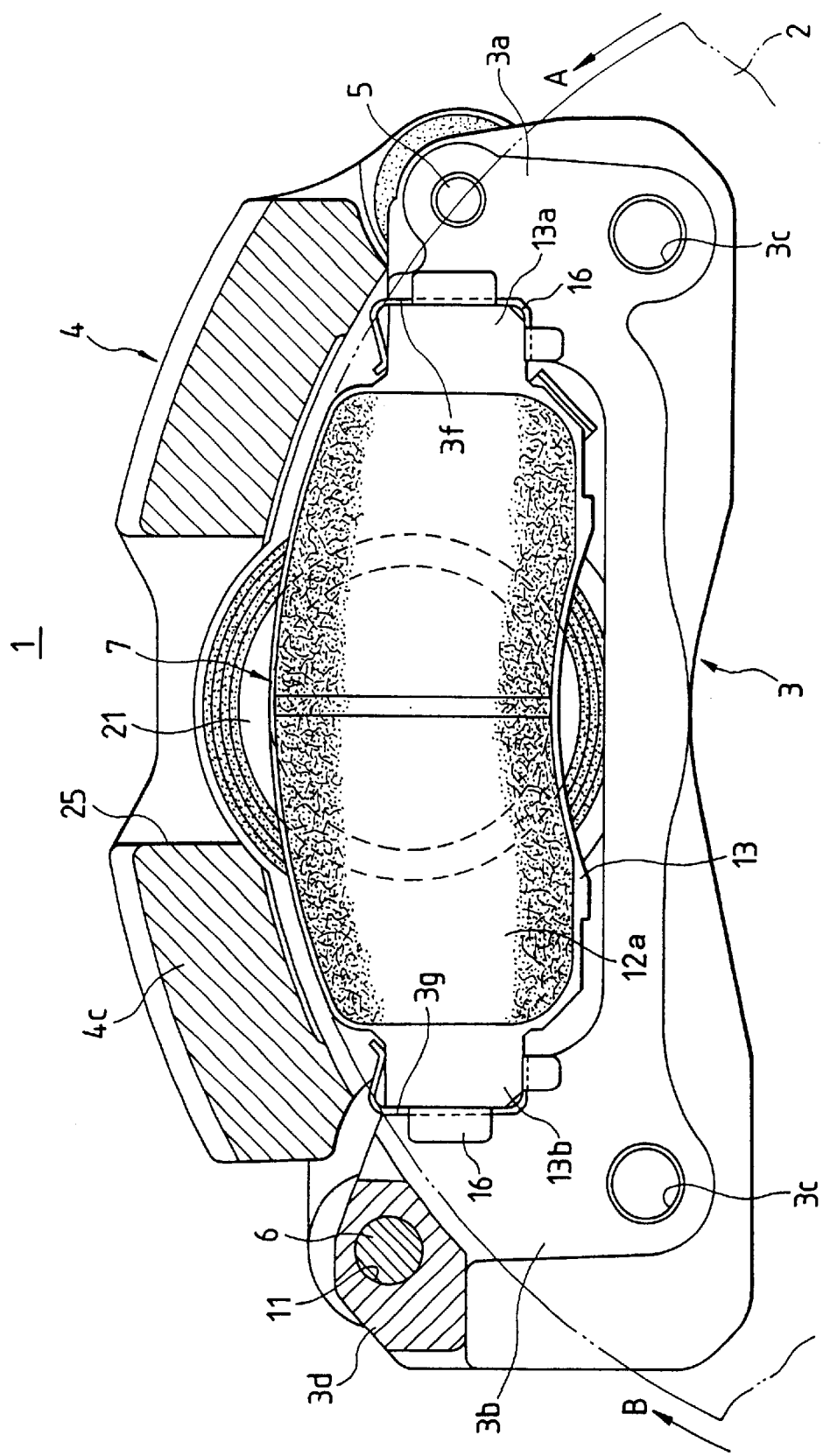
FIG. 6 is a sectional view taken on line VI—VI of FIG. 4.

Referring now to FIGS. 1–6, there is described a first embodiment of the present invention. In the drawings, an arrow A represents the direction in which a disk rotor is rotated while a vehicle is traveling forward, whereas an arrow B represents the direction in which the disk rotor is rotated while the vehicle is moving backward. Further, hereinafter, the terms "rotor-in side" and "rotor-out side" are referred as a case where the disk rotor rotates in direction of arrow A while the vehicle is traveling forward unless otherwise specified.

In a disk brake 1, a caliper bracket 3 is fixed to a vehicle body in one side portion of a disk rotor 2. A pin slide type caliper body 4 is supported to the caliper bracket 3 so that the caliper body 4 may be movable in the axial direction of a disk via a reverse pin 5 and a collet pin 6. A pair of opposed friction pads 7 and 8 are disposed between the acting portion 4a and reacting portion 4b of the caliper body 4 with the disk rotor 2 held therebetween.

The caliper bracket 3 is in the form of a substantially angular U-shaped plate body arranged along the one side of the disk rotor 2. A first arm 3a and a second arm 3b of the caliper bracket 3 are juxtaposed to each other outwardly in the radial direction of the disk on the rotor-in and rotor-out sides during the forward traveling of the vehicle. Internal threaded holes 3c for fitting the caliper bracket to the vehicle body are respectively bored in the bases of the first arm 3a and the second arm 3b. A caliper supporting arm 3d striding over the outside of the disk rotor 2 is extended in parallel to the disk axis. A third arm 3e having the same height as the second arm 3b is provided at the leading end of the caliper supporting arm 3d extended toward the other side portion of the disk rotor 2.

Torque-receiving stepped portions 3f and 3g are provided to the respective first and second arms 3a and 3b of the caliper bracket 3. A torque-receiving stepped portion 3h that is substantially the same in shape as the second arm 3b is provided to the third arm 3e. An internal threaded hole 10 is passed through the first arm 3a in a position where the internal threaded hole substantially intersects the outer peripheral edge of the disk rotor 2. The reverse pin 5 is projected in the internal threaded hole 10 in parallel to the disk axis in a direction opposite to the disk rotor. A closed-end pin hole 11 in parallel to the disk axis is provided to the caliper supporting arm 3d positioned outwardly in the radial direction of the disk further than the outer peripheral edge of the disk rotor 2, the pin hole 11 being opened in one side of the disk rotor 2.

The caliper body 4 includes the aforementioned acting portion 4a and the reacting portion 4b disposed opposite on both sides of the disk rotor 2, and a bridge portion 4c for connecting these portions 4a and 4b by striding over the outside of the disk rotor 2. In the center of the acting portion 4a, there is provided a closed-end cylinder hole 20 opening toward the disk rotor 2. A cup-shaped piston 21 is liquid-tightly and movably received in the cylinder hole 20, and a hydraulic chamber 22 is formed between the piston 21 and the bottom wall 4d of the cylinder hole 20. A union hole 23 communicating with the hydraulic chamber 22 is provided in the bottom wall 4d of the cylinder hole 20. The working fluid pressured by a fluid pressure master cylinder (not shown) is introduced into the hydraulic chamber 22 from the union hole 23 so as to push the piston 21.

In the reacting portion 4b, there is juxtaposed a pair of reaction pawls 4e and 4f inwardly in the radial direction of the disk on the rotor-in and rotor-out sides with a gap 24 for receiving the piston held therebetween. Circular fitting holes 4g and 4h are passed through the respective reaction pawls 4e and 4f. The friction pad 7 on the acting portion side is disposed between the leading end of the piston 21 projecting from the cylinder hole 20 and one side of the disk rotor 2, whereas the friction pad 8 on reacting portion side is disposed between the reaction pawls 4e and 4f and the other side of the disk rotor 2. A top opening 25 is formed in the center of the bridge portion 4c to thereby radiate the braking heat generated by the sliding contact of the disk rotor 2 with the linings 12a and 12b, respectively, of the friction pads 7 and 8 through the top opening 25 and to visually inspect the frictional conditions of the linings 12a and 12b.

On the rotor-in and rotor-out sides in the acting portion 4a are provided with arms 4i and 4j for mounting the vehicle body, the arms 4i and 4j projecting along the one side of the disk rotor 2. A pin hole 26 is penetratingly provided in the leading end of the arm 4i on the rotor-in side in parallel with the disk axis. The collet pin 6 is projectingly provided in parallel with the disk axis by a fixing bolt 27 provided at the leading end of the arm 4j on the rotor-out side. The reverse pin 5 projecting in the first arm 3a of the caliper bracket 3 is movably inserted into the pin hole 26 on the rotor-in side via a sleeve 28. The collet pin 6 on the rotor-out side is also movably inserted into the pin hole 11 of the caliper supporting arm 3d. The caliper body 4 is thus slidably guided in the axial direction of the disk by the movement of these pins 5 and 6 relative to the pin holes 11 and 26.

The friction pads 7 and 8 are formed with the respective linings 12a and 12b kept in slidable contact with the sides of the disk rotor 2, and metal back plates 13 and 14 for holding the linings 12. A judder preventing shim plate 15 is made to engage with the back of the back plate 14 of the friction pad 8 on the reacting portion side. With respect to the friction pad 7 on the acting portion side, lugs 13a and 13b are projected from the back plate 13 on the rotor-in and rotor-out sides. The lugs 13a and 13b of the friction pad 7 are respectively supported to the torque-receiving stepped portions 3f and 3g of the first and second arms 3a and 3b of the caliper bracket 3 via pad retainers 16.

Lugs 14a and 14b are provided on the rotor-in and rotor-out sides of the back plate 14 of the friction pad 8 on the reacting portion side, and three protrusions 14c, 14d and 14e are disposed in a straight line on the back of the back plate 14. A pad spring 17 is fitted to the central small rectangular projection 14c by a fixing means, for example, by press-fitting or caulking. The lug 14b on the rotor-out side of the friction pad 8 on the reacting portion side is supported to the torque-receiving stepped portion 3h of the third arm 3e of the caliper bracket 3 via the pad retainer 16. While the circular protrusions 14d and 14e on the rotor-in and rotor-out sides are fitted in the fitting holes 4g and 4h of the respective reaction pawls 4e and 4f, both wings 17a and 17a of the pad spring 17 are fitted to the reaction pawls 4e and 4f. The pad assembly pieces 17b are brought into resilient contact with the pawls 4e and 4f.

The fitting holes 4g and 4h of the reaction pawls 4e and 4f are formed so that these holes are set greater in diameter than the protrusions 14d and 14e of the friction pad 8 on the reacting portion side. As described the above, in the condition that the lug 14b of the friction pad 8 is supported to the torque-receiving stepped portion 3h of the caliper bracket 3, the fitting hole 4h of the reaction pawl 4f on the rotor-out side is set so that the fitting hole coincides with the center of the protrusion 14e on the rotor-out side.

Moreover, the fitting hole 4g of the reaction pawl 4e on the rotor-in side and the fitting hole 4h of the reaction pawl 4f on the rotor-out side are provided so as to be offset to each other by a length of L1 in the radial direction of the disk. The fitting hole 4g on the rotor-in side is made closer to the center line CL1 of the caliper than the fitting hole 4h on the rotor-out side. The pitch P1 of the protrusions 14d and 14e of the friction pad 8 is set longer than the pitch P2 of the fitting holes 4g and 4h of the reaction pawls 43 and 4f.

Hence, the fitting hole 4g of the reaction pawl 4e on the rotor-in side and the protrusion 14d on the rotor-in side of the friction pad 8 are brought into contact with each other at the intersection point P of the circumference C drawn by a radius R passing through the center O2 of the fitting hole 4g and having the center O1 of rotation of the disk rotor 2 as a fulcrum with the wall surface on the rotor-in side of the fitting hole 4g. As the fitting hole 4g and the protrusion 14d on the rotor-in side are thus brought into contact with each other at the intersection point P, the amount of deflection and pitch of the fitting holes 4g and 4h and the protrusions 14d and 14e as well as other conditions may be set different from those in this embodiment of the invention.

This embodiment of the invention is thus constituted and when the working fluid raised in pressure is supplied to the hydraulic chamber 22 of the caliper body 4 through the braking operation performed by the driver, the piston 21 is moved forward through the cylinder hole 20 in the direction of the opening. Then the friction pad 7 on the side of the acting portion 4a is pushed so as to press the lining 12a of the friction pad 7 against the one side of the disk rotor 2. This reacting causes the caliper body 4 to be moved to the acting portion 4a under the guidance of the reverse pin 5 and the collet pin 6. The reaction pawls 4e and 4f of the reacting portion 4b pushes the friction pad 8 on the side of the reacting portion 4b to have the lining 12b of the friction pad 8 pressed against the other side of the disk rotor 2, so that the braking operation is performed.

At the aforementioned time of applying the brake, braking torque is generated in the friction pads 7 and 8 by bringing the linings 12a and 12b into slidable contact with the disk rotor 2. Then, the braking torque causes the friction pads 7 and 8 to be dragged in direction of arrow A or B equal to the direction of rotation of the disk rotor 2. In the case of applying the brake when the vehicle is traveling forward during which the disk rotor 2 is rotated in direction of arrow A, the lug 13b of the back plate 13 of the friction pad 7 on the side of the acting portion 4a is rotatably supported by the torque-receiving stepped portion 3g of the second arm 3b, whereas the lug 14b of the back plate 14, on the rotor-out side, of the friction pad 8 on the side of the reacting portion 4b is supported by the torque-receiving stepped portion 3h at the leading end of the caliper supporting arm 3d. Thus, the braking torque of the friction pads 7 and 8 is transmitted to the caliper bracket 3.

When the brake is applied while the vehicle is moving backward in which the disk rotor 2 is rotated in direction of arrow B, the lug 13a of the back plate 13 of the friction pad 7 on the side of the acting portion 4a is supported by the torque-receiving stepped portion 3f of the first arm 3a, and the braking torque of the friction pad 7 is transmitted to the caliper bracket 3. Whereas the friction pad 8 on the side of the reacting portion 4b is supported by bringing the protrusion 14d of the back plate 14 into contact with the fitting hole 4g of the reaction pawl 4e at the intersection point P, and the braking torque of the friction pad 8 is transmitted to the caliper body 4 via the reaction pawl 4e.

According to this embodiment of the invention, the braking torque generated in the friction pad 8 on the reacting portion side in the direction in which the vehicle travels forward is directly transmitted from the torque-receiving stepped portions 3g and 3h to the caliper bracket 3 and not to the reacting portion 4b of the caliper body 4. Therefore, the reacting portion 4b is never distorted by the braking torque applied in the direction in which the vehicle travels forward. Thus, excellent slidableness in the axial direction of the disk is maintained in the caliper body 4 and no partial wear is produced in the linings 12a and 12b, respectively of the friction pads 7 and 8. Moreover, the caliper supporting arm 3d is provided on only the rotor-out side at the time of the forward traveling of the vehicle and since the caliper supporting arm does not stride over the reacting portion side of the disk rotor 2 in the rotor-in side, the caliper bracket 3 is made smaller and more lightweight to that extent.

With respect to the braking torque applied in the direction in which the vehicle travels forward, further, the lug 14b on the rotor-out side of the friction pad 8 on the reacting portion side is pressed against the torque-receiving stepped portion 3h, and the reacting portion 4b is deflected by the rotational moment to the rotor-out side, whereby the protrusion 14d on the rotor-in side is pressed against the fitting hole 4g. Consequently, the friction pad 8 on the reacting portion side is restricted over a long span between the rotor-in and rotor-out sides and since the improper behavior of the friction pad 8 is suppressed during the braking operation, the vibration of the friction pad 8 and the generation of the brake judder are suppressed as much as possible. Since the improper behavior is thus suppressed, the improper behavior of the caliper body 4 mated with the friction pad 8 by means of the protrusion 14d and the fitting hole 4g is also suppressed.

The braking torque applied in the direction in which the vehicle moves backward is smaller than the braking torque applied in the direction in which the vehicle travels forward. Therefore, although the braking torque generated in the friction pad 8 on the reacting portion side in the direction in which the vehicle moves backward is transmitted through the mating of the protrusion 14d with the fitting hole 4g to the reaction pawl 4e of the reacting portion 4b, the deflective deformation of the reacting portion 4b can be made as small as possible. This makes it unnecessary to thicken the reaction pawl 4e in order to increase its rigid force and thus prevents the weight and size of the caliper body 4 from increasing. Fitting the protrusion 14e of the friction pad 8 on the reacting portion side to the fitting hole 4h of the reaction pawl 4f while the vehicle is moving backward prevents the friction pad 8 on the reacting portion side from floating outside of the disk rotor 2 by the appliance of the brake in the direction in which the vehicle moves backward, which is useful for increasing the braking force.

In particular, the protrusion 14d disposed on the rotor-out side while the vehicle is moving backward is brought into contact with the fitting hole 4g beforehand at the intersection point P on the circumference C. Therefore, the braking torque in the direction in which the vehicle moves backward generated in the friction pad 8 on the reacting portion side is transmitted from the circumference C passing through the center O2 of the fitting hole 4g to the reaction pawl 4e of the reacting portion 4b at the intersection point P in the tangential direction thereof. Consequently, the friction pad 8 on the reacting portion side is prevented from making an excessive movement and allows the braking torque in the direction in which the vehicle moves backward to be instantly transmitted from the reaction pawl 4e to the caliper body 4, whereby the initial braking force is raised quickly during the braking operation while the vehicle is moving backward. As the protrusion 14d is restrained from prying open the fitting hole 4g, these are also effectively prevented from being worn out as well as producing the prying sound.

Although a description has been given of a case where the reverse pin is disposed on the rotor-in side while the vehicle is traveling forward and the collet pin on the rotor-out side while the vehicle is traveling forward, it is only needed for the caliper body to be of any pin slide type, and the slide pin is not restrictive to a specific type.

The protrusions and the fitting holes for use in mating the friction pad on the reacting portion side with the reacting portion of the caliper body may be arranged differently in that protrusions are provided in the reacting portion of the caliper body and fitting holes are bored in the friction pad on the reacting portion side. If fitting the protrusions in the respective fitting holes is carried out on the rotor-out side of the reacting portion at the time that the vehicle is traveling forward, this arrangement will be useful in increasing the braking force because the friction pad on the reacting portion side is prevented from floating outside of the disk rotor due to the brake applied in the direction in which the vehicle moves backward. However, that arrangement may be omitted without any inconvenience according to the present invention.

As set forth above, the braking force generated in the friction pad on the reacting portion side in the direction in which the vehicle travels forward is directly transmitted from the friction pad to the caliper bracket and is not transmitted to the reacting portion of the caliper body. Therefore, since the deflective deformation of the reacting portion due to the braking torque generated in the direction in which the vehicle travels forward is obviated in the caliper body, the caliper body can be slid smoothly in the axial direction of the disk and partial wear hardly occurs in the lining of the friction pad. As the caliper bracket does not stride over the reacting portion side of the disk rotor on the rotor-in side while the vehicle is traveling forward, moreover, the caliper bracket can be made lightweight to that extent.

Although the braking torque in the direction in which the vehicle moves backward generated in the friction pad on the reacting portion side is transmitted to the reacting portion of the caliper body via the protrusions and the fitting holes, the deflective deformation of the reacting portion is suppressed as much as possible because the braking torque generated in the direction in which the vehicle moves backward is smaller than what is generated in the direction in which the vehicle travels forward, so that the caliper body is less badly affected thereby.

In addition, the friction pad on the reacting portion side on the rotor-out side is pressed by the braking torque generated in the direction in which the vehicle travels forward against the caliper bracket. Further, the protrusions on the rotor-in side are also pressed against the fitting holes as the reacting portion of the caliper body is deflected by the rotational moment toward the rotor-out side. Therefore, the friction pad on the reacting portion side is restricted over a long span between the rotor-in and rotor-out sides and as the improper behavior of the friction pad is suppressed during the braking operation, the vibration of the friction pad and the generation of a brake judder on the reacting portion side are suppressed as much as possible. Since the improper behavior of the friction pad on the reacting portion side is thus suppressed, the improper behavior of the caliper body mated with the friction pad by means of the protrusion and the fitting hole is also suppressed.

Since the braking torque generated in the friction pad on the reacting portion side in the direction in which the vehicle moves backward acts at the intersection point P from the circumference C passing through the center O2 of the fitting hole in the tangential direction of the reacting portion of the caliper body, the friction pad is prevented from making an excessive movement and allows the braking torque in the direction in which the vehicle moves backward to be instantly transmitted to the reacting portion of the caliper body, whereby the initial braking force is raised quickly during the braking operation while the vehicle is moving backward. As the protrusion is restrained from prying open the fitting hole, these are also effectively prevented from being worn out as well as producing prying sound.

Second Embodiment

Referring now to FIGS. 7–12, there is described a second embodiment of the present invention. Portions identical to those having been described in the first embodiment are referred to by the common symbols.

In the second embodiment, a pad spring 17' which is different in shape from the pad spring 17 of the first embodiment, is secured to the central small rectangular projection 14c.

Figure 12:
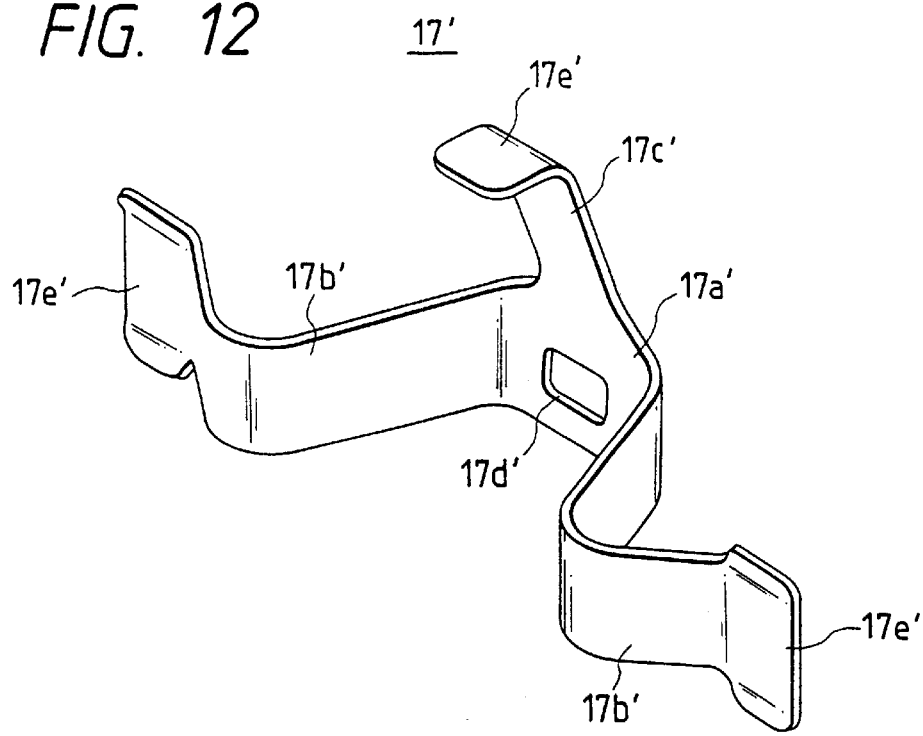
FIG. 12 is a perspective view of a pad spring according to the second embodiment.
Figure 13:
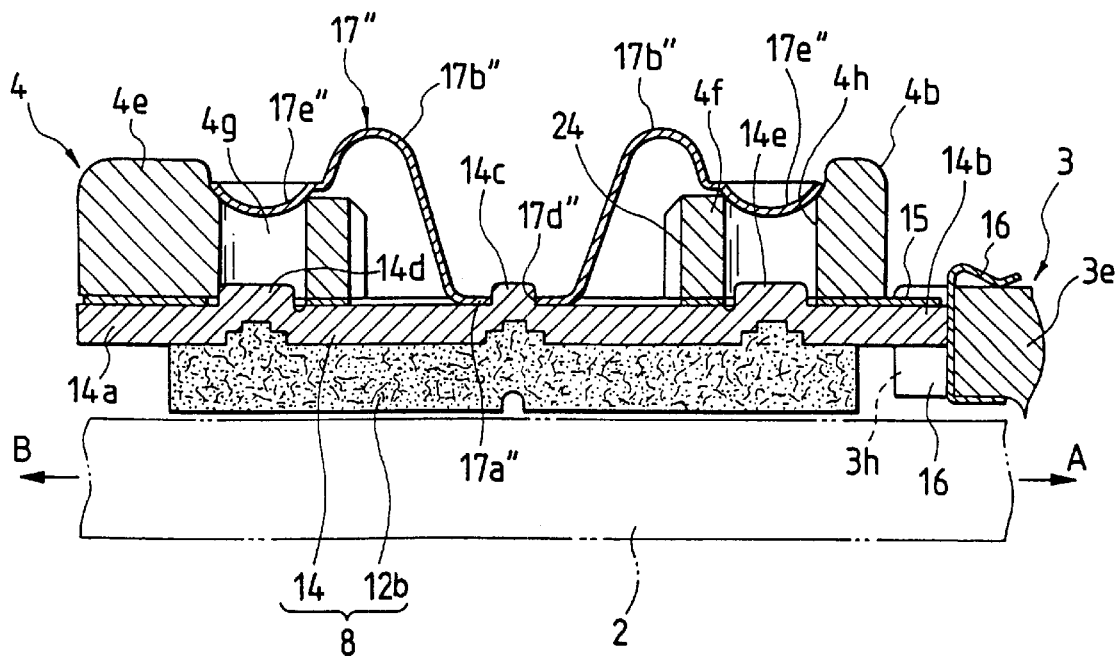
FIG. 13 is a partial plan view showing the principal part of a disk brake according to a third embodiment of the present invention.

As shown in FIG. 12, the pad spring 17' includes a central pad fitting portion 17a', pad assembling pieces 17b', and 17b' projecting from the respective sides of the pad fitting portion 17a', and a spring piece 17c' extending from one side edge of the pad fitting portion 17a' in a direction perpendicular to the pad assembling pieces 17b' and 17b'. The pad fitting portion 17a' is in the form of a flat plate so as to adhere to the back plate 14 with a rectangular hole 17d' bored in its center.

The pad assembling pieces 17b' and 17b' are formed so as to open both wing pieces from the central pad fitting portion 17a'. The spring piece 17c' is tilted in the same direction of the pad assembling pieces 17b' and 17b'. A suitable resilient force is set to the pad assembling pieces 17b' and 17b' as well as the spring piece 17c', and contact pieces 17e' brought into resilient contact with the reacting portion 4b are provided so as to be slightly tilted at the respective leading ends of these pieces 17b', 17b' and 17c'.

The pad spring 17' is fitted to the friction pad 8 on the reacting portion side by fixedly fitting, for example, by press-fitting or caulking, the rectangular protrusion 14c of the back plate 14 in the rectangular hole 17d' while making the pad fitting portion 17a' adhering to the back of the back plate 14 of the friction pad 8 on the reacting portion side. The pad assembling pieces 17b' and 17b' and the spring piece 17c' are projected in the opposite direction of the friction pad 8 in such a state that the pad spring 17' has thus been fitted thereto.

The friction pad 8 with the pad spring 17' thus secured thereto has the circular protrusions 14d and 14e on the rotor-in and rotor-out sides fitted in the respective fitting holes 4g and 4h of the reaction pawls 4e and 4f of the caliper body 4 and also brings the contact pieces 17e' and 17e' of both the pad assembling pieces 17b' and 17b' into resilient contact with the respective external surfaces of the reaction pawls 4e' and 4f'. Accordingly, the inside and outside of the reaction pawls 4e and 4f are hold by the back plate 14 and the pad assembling pieces 17b' and 17b'. Further, the friction pad 8 brings the contact piece 17e' of the spring piece 17c' into resilient contact with the upper bottom wall of the piston receiving recess 24 between the reaction pawls 4e and 4f, so that the friction pad 8 is temporarily assembled with the caliper body 4 before the caliper body 4 is assembled with the vehicle body.

Thus, the caliper body 4 temporarily loaded with the friction pad 8 on the reacting portion side beforehand is supported by the caliper bracket 3 via the reverse pin 5 and the collet pin 6 movably in the axial direction of the disk, as described the above. The friction pad 8 on the reacting portion side is supported with the lug 14b on the rotor-out side supported by the torque-receiving stepped portion 3h of the third arm 3e of the caliper bracket 3 via the pad retainer 16.

The spring piece 17c' of the pad spring 17' that has brought the contact piece 17e' into resilient contact with the upper bottom wall of the piston receiving recess 24 urges the caliper body 4 outwardly in the radial direction of the disk or otherwise urges the friction pad 8 on the reacting portion side inwardly in the radial direction of the disk so as to separate the friction pad from the caliper body 4. The amount of movement acting on the caliper body 4 from the spring piece 17c' outwardly in the radial direction of the disk stays in a very small range of clearance until the protrusion 14d on the rotor-in side of the friction pad 8 supporting the lug 14b on the rotor-out side by the torque-receiving stepped portion 3h of the caliper bracket 3 is brought in contact with the inner wall of the fitting hole 4g at the intersection point P.

The fitting hole 4h of the reaction pawl 4f on the rotor-out side is set so that the fitting hole coincides with the center of the protrusion 14e on the rotor-out side while the lug 14b on the rotor-out side of the friction pad 8 is supported by the torque-receiving stepped portion 3h of the caliper bracket 3.

Moreover, as well as the first embodiment, the fitting hole 4g of the reaction pawl 4e on the rotor-in side and the fitting hole 4h of the reaction pawl 4f on the rotor-out side are provided so as to be offset to each other by a length of L1 in the radial direction of the disk. The fitting hole 4g on the rotor-in side is made closer to the center line CL1 of the caliper than the fitting hole 4h on the rotor-out side. The pitch P1 of the protrusions 14d and 14e of the friction pad 8 is set longer than the pitch P2 of the fitting holes 4g and 4h of the reaction pawls 43 and 4f.

Hence, the fitting hole 4g of the reaction pawl 4e on the rotor-in side and the protrusion 14d on the rotor-in side of the friction pad 8 are brought into contact with each other at the intersection point P of the circumference C drawn by a radius R passing through the center O2 of the fitting hole 4g and having the center O1 of rotation of the disk rotor 2 as a fulcrum with the wall surface on the rotor-in side of the fitting hole 4g. As the fitting hole 4g and the protrusion 14d on the rotor-in side are thus brought into contact with each other at the intersection point P, the amount of deflection and pitch of the fitting holes 4g and 4h and the protrusions 14d and 14e as well as other conditions may be set different from those in this embodiment of the invention.

The second embodiment of the invention is thus constituted and when the working fluid raised in pressure is supplied to the hydraulic chamber 22 of the caliper body 4 through the braking operation performed by the driver, the piston 21 is moved forward through the cylinder hole 20 in the direction of the opening. Then the friction pad 7 on the side of the acting portion 4a is pushed so as to press the lining 12a of the friction pad 7 against the one side of the disk rotor 2. This reacting causes the caliper body 4 to be moved to the acting portion 4a under the guidance of the reverse pin 5 and the collet pin 6. The reaction pawls 4e and 4f of the reacting portion 4b pushes the friction pad 8 on the side of the reacting portion 4b to have the lining 12b of the friction pad 8 pressed against the other side of the disk rotor 2, so that the braking operation is performed.

At the aforementioned time of applying the brake, braking torque is generated in the friction pads 7 and 8 by bringing the linings 12a and 12b into slidable contact with the disk rotor 2. Then, the braking torque causes the friction pads 7 and 8 to be dragged in direction of arrow A or B equal to the direction of rotation of the disk rotor 2. In the case of applying the brake when the vehicle is traveling forward during which the disk rotor 2 is rotated in direction of arrow A, the lug 13b of the back plate 13 of the friction pad 7 on the side of the acting portion 4a is rotatably supported by the torque-receiving stepped portion 3g of the second arm 3b, whereas the lug 14b of the back plate 14, on the rotor-out side, of the friction pad 8 on the side of the reacting portion 4b is supported by the torque-receiving stepped portion 3h at the leading end of the caliper supporting arm 3d. Thus, the braking torque of the friction pads 7 and 8 is transmitted to the caliper bracket 3.

The friction pad 8 on the reacting portion side engages with the reaction pawl 4e of the reacting portion 4b by the fitting of the protrusion 14d on the rotor-in side with the fitting hole 4g. The reaction pawls 4e and 4f of the reacting portion 4b are internally and externally held by the back plate 14 and the pad assembling pieces 17b' and 17b' of the pad spring 17', to thereby temporarily assemble the friction pad 8 with the caliper body 4 beforehand. Thus, even though external force in the axial or radial direction of the disk is applied to the friction pad 8 or the pad spring 17 when the work of assembling the caliper body 4 with the vehicle body is done, the friction pad 8 on the reacting portion side is prevented from slipping off the reacting portion 4b at random, whereby workability of assembling the caliper body is improved.

In the friction pad 8 on the reacting portion side, the lug 14b on the rotor-out side of is supported by the torque-receiving stepped portion 3h of the caliper supporting arm 3d. Thus, even though the spring piece 17c' has not so much resilient force, the backlash of the caliper body 4 and the friction pad 8 on the reacting portion side due to the travel vibration of the vehicle with respective discrete oscillation frequencies in the radial direction of the disk is suppressed as much as possible. Accordingly, the protrusions 14d and 14e are restrained from prying open the respective fitting holes 4g and 4h with the effect of preventing these from being worn out and producing backlash sound.

As stated above, although the spring piece 17c' of the pad spring 17' resiliently urges the caliper body 4 outwardly in the radial direction of the disk and urges the friction pad 8 on the reacting portion side inwardly in the radial direction of the disk, which separates the friction pad 8 from the caliper body 4, the amount of movement of the caliper body 4 outwardly in the radial direction of the disk stays in a very small range of clearance until the protrusion 14d on the rotor-in side of the friction pad 8 in which the lug 14b on the rotor-out side is supported by the torque-receiving stepped portion 3h of the caliper bracket 3, is brought in contact with the inner wall of the fitting hole 4g at the intersection point P.

Therefore, the outward tilting of the caliper body 4 in the radial direction of the disk due to the resilient force of the spring piece 17c' can be made smaller as much as possible than before, which results in hardly causing the partial wear of the lining 12b as well as the brake judder without impairing the sliding properties of the caliper body 4.

Further, according to the second embodiment of the invention, the braking torque generated in the friction pad 8 on the reacting portion side in the direction in which the vehicle travels forward is directly transmitted from the torque-receiving stepped portions 3g and 3h to the caliper bracket 3 and not to the reacting portion 4b of the caliper body 4. Therefore, the reacting portion 4b never distorted by the braking torque applied in the direction in which the vehicle travels forward. Thus, excellent slidableness in the axial direction of the disk is maintained in the caliper body 4 and no partial wear is produced in the linings 12a and 12g, respectively of the friction pads 7 and 8. Moreover, the caliper supporting arm 3d is provided on only the rotor-out side at the time of the forward traveling of the vehicle and since the caliper supporting arm does not stride over the reacting portion side of the disk rotor 2 in the rotor-in side, the caliper bracket 3 is made smaller and more lightweight to that extent.

With respect to the braking torque applied in the direction in which the vehicle travels forward, further, the lug 14b on the rotor-out side of the friction pad 8 on the reacting portion side is pressed against the torque-receiving stepped portion 3h, and the reacting portion 4b is deflected by the rotational moment to the rotor-out side, whereby the protrusion 14d on the rotor-in side is pressed against the fitting hole 4g. Consequently, the friction pad 8 on the reacting portion side is restricted over a long span between the rotor-in and rotor-out sides and since the improper behavior of the friction pad 8 is suppressed during the braking operation, the vibration of the friction pad 8 and the generation of the brake judder are suppressed as much as possible. Since the improper behavior is thus suppressed, the improper behavior of the caliper body 4 mated with the friction pad 8 by means of the protrusion 14d and the fitting hole 4g is also suppressed.

The braking torque applied in the direction in which the vehicle moves backward is smaller than the braking torque applied in the direction in which the vehicle travels forward. Therefore, although the braking torque generated in the friction pad 8 on the reacting portion side in the direction in which the vehicle moves backward is transmitted through the mating of the protrusion 14d with the fitting hole 4g to the reaction pawl 4e of the reacting portion 4b, the deflective deformation of the reacting portion 4b can be made as small as possible. This makes it unnecessary to thicken the reaction pawl 4e in order to increase its rigid force and thus prevents the weight and size of the caliper body 4 from increasing. Fitting the protrusion 14e of the friction pad 8 on the reacting portion side to the fitting hole 4h of the reaction pawl 4f while the vehicle is moving backward prevents the friction pad 8 on the reacting portion side from floating outside of the disk rotor 2 by the appliance of the brake in the direction in which the vehicle moves backward, which is useful for increasing the braking force.

In particular, the protrusion 14d disposed on the rotor-out side white the vehicle is moving backward is brought into contact with the fitting hole 4g beforehand at the intersection point P on the circumference C. Therefore, the braking torque in the direction in which the vehicle moves backward generated in the friction pad 8 on the reacting portion side is transmitted from the circumference C passing through the center O2 of the fitting hole 4g to the reaction pawl 4e of the reacting portion 4b at the intersection point P in the tangential direction thereof. Consequently, the friction pad 8 on the reacting portion side is prevented from making an excessive movement and allows the braking torque in the direction in which the vehicle moves backward to be instantly transmitted from the reaction pawl 4e to the caliper body 4, whereby the initial braking force is raised quickly during the braking operation while the vehicle is moving backward. As the protrusion 14d is restrained from prying open the fitting hole 4g, these are also effectively prevented from being worn out as well as producing the prying sound.

Third Embodiment

Figure 7:
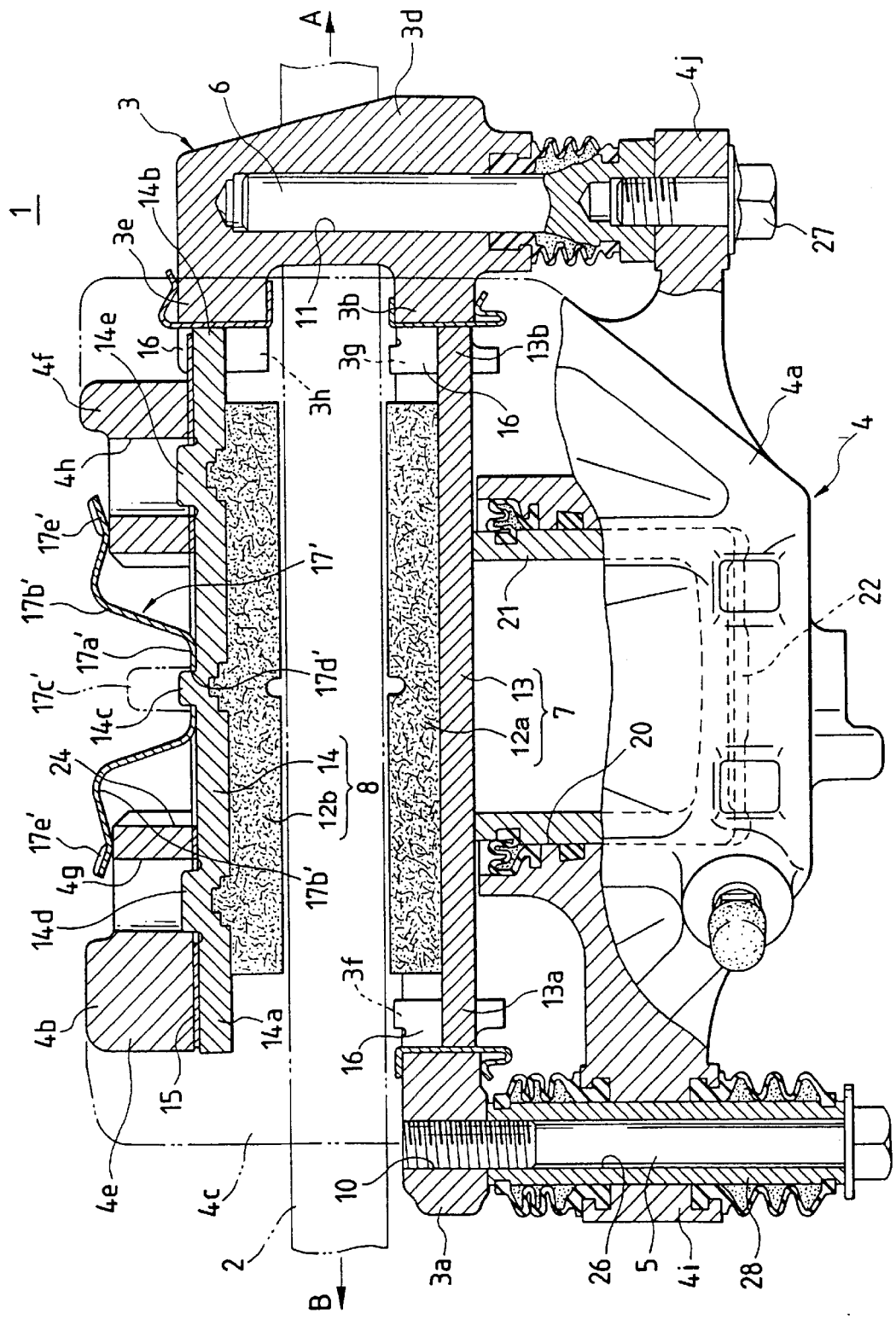
FIG. 7 is a sectional partial plan view of a disk brake according to a second embodiment of the present invention.
Figure 8:
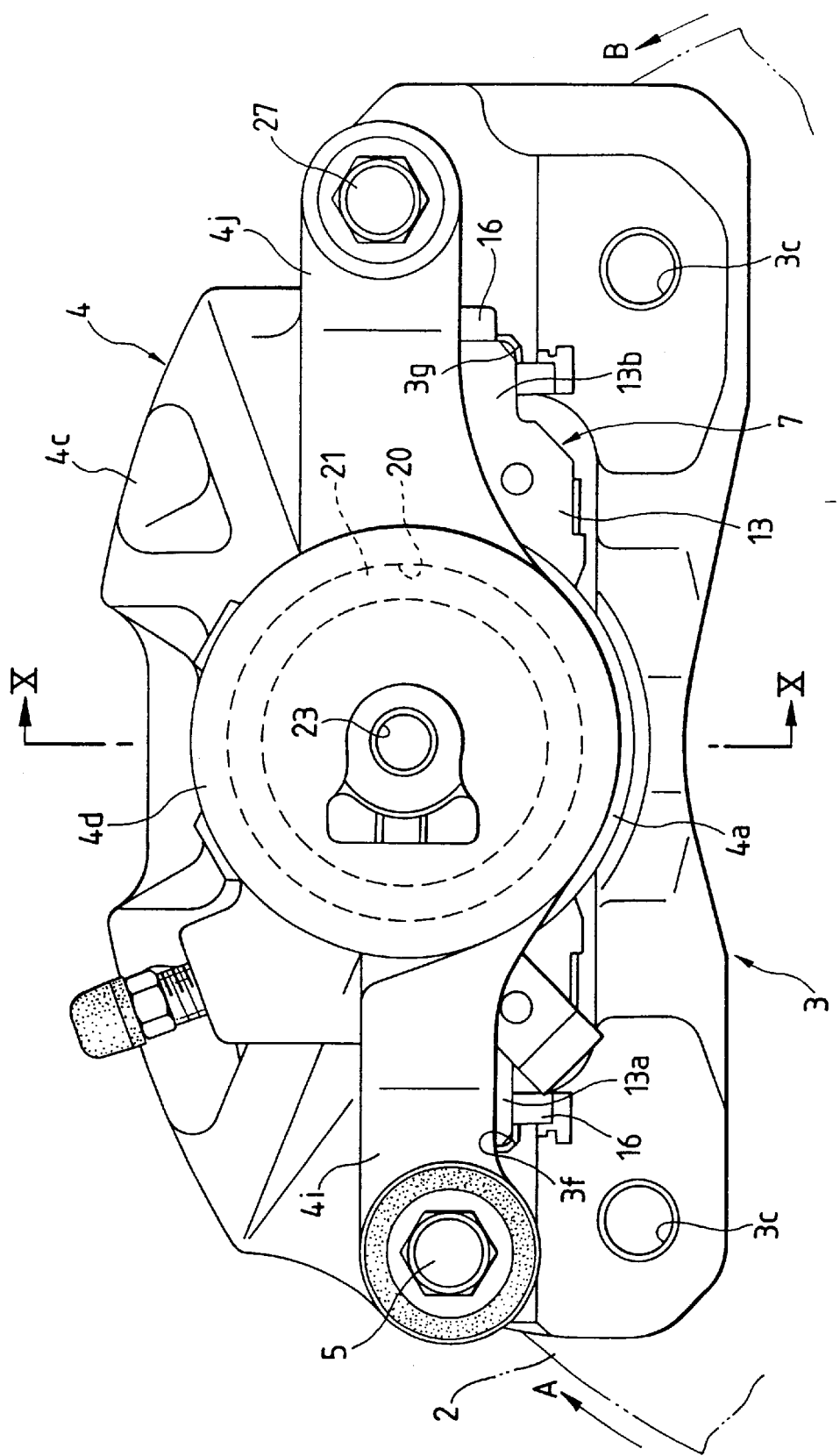
FIG. 8 is a front view of the disk brake according to the second embodiment.
Figure 9:
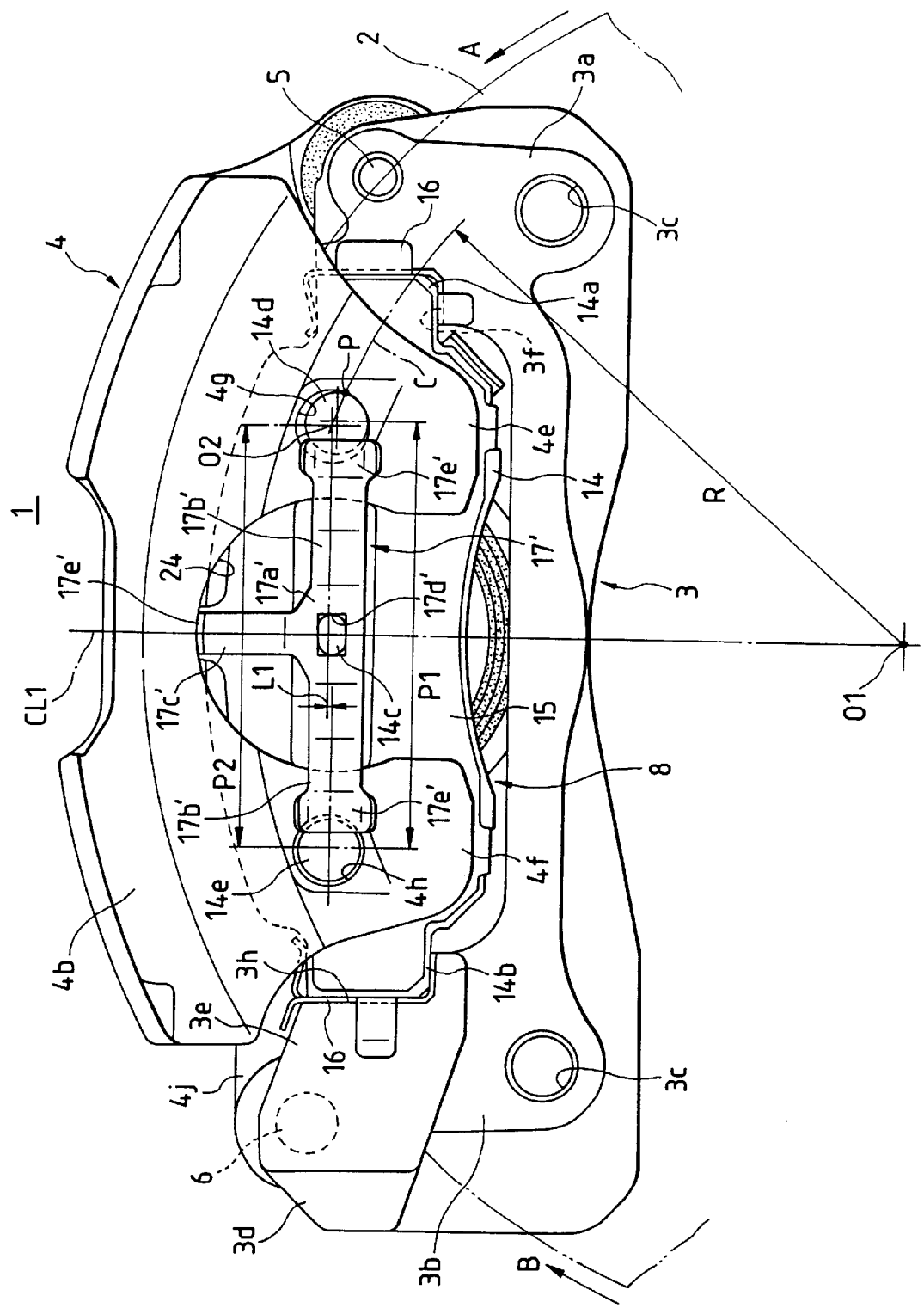
FIG. 9 is a rear view of the disk brake according to the second embodiment.
Figure 10:
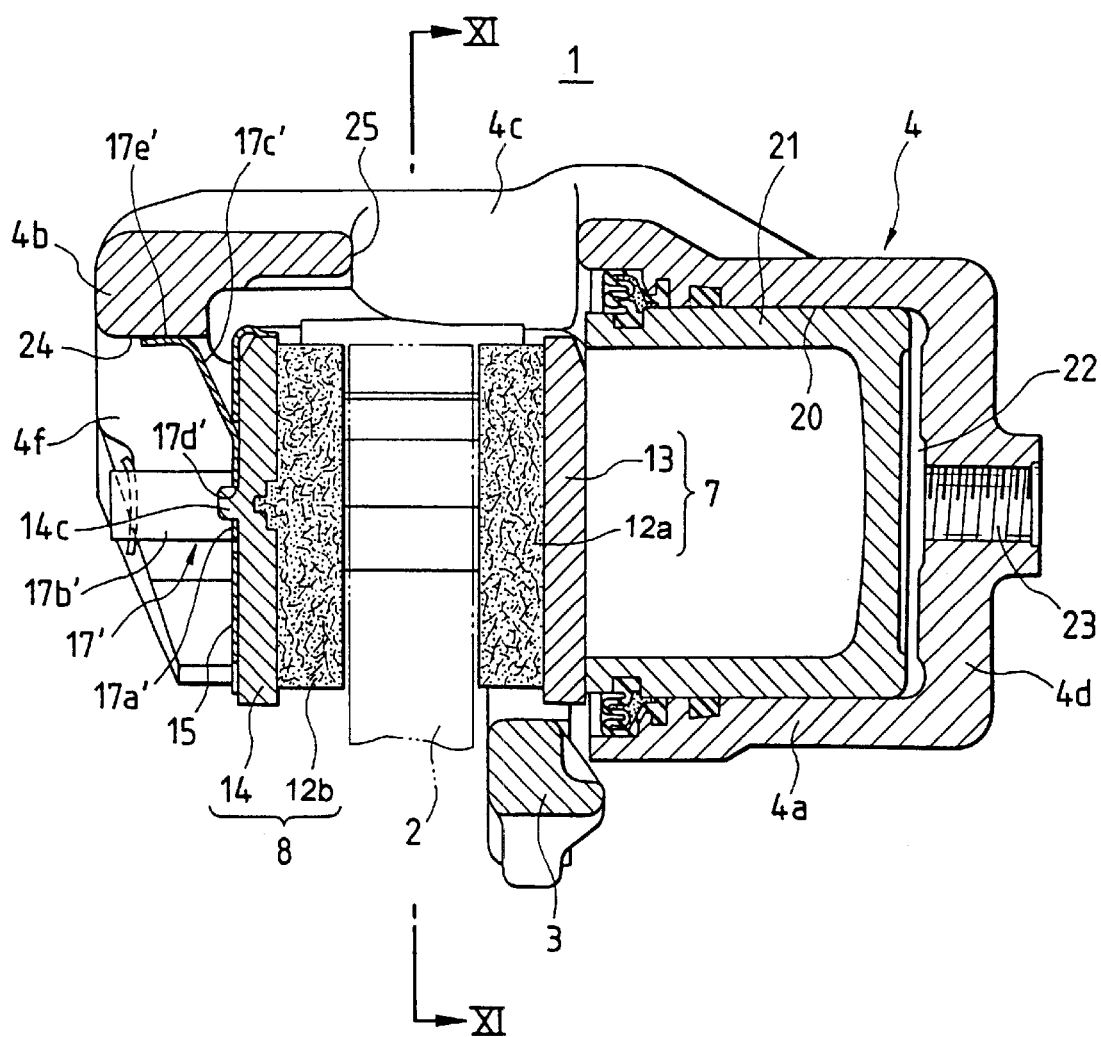
FIG. 10 is a sectional view taken on line X—X of FIG. 8.
Figure 11:
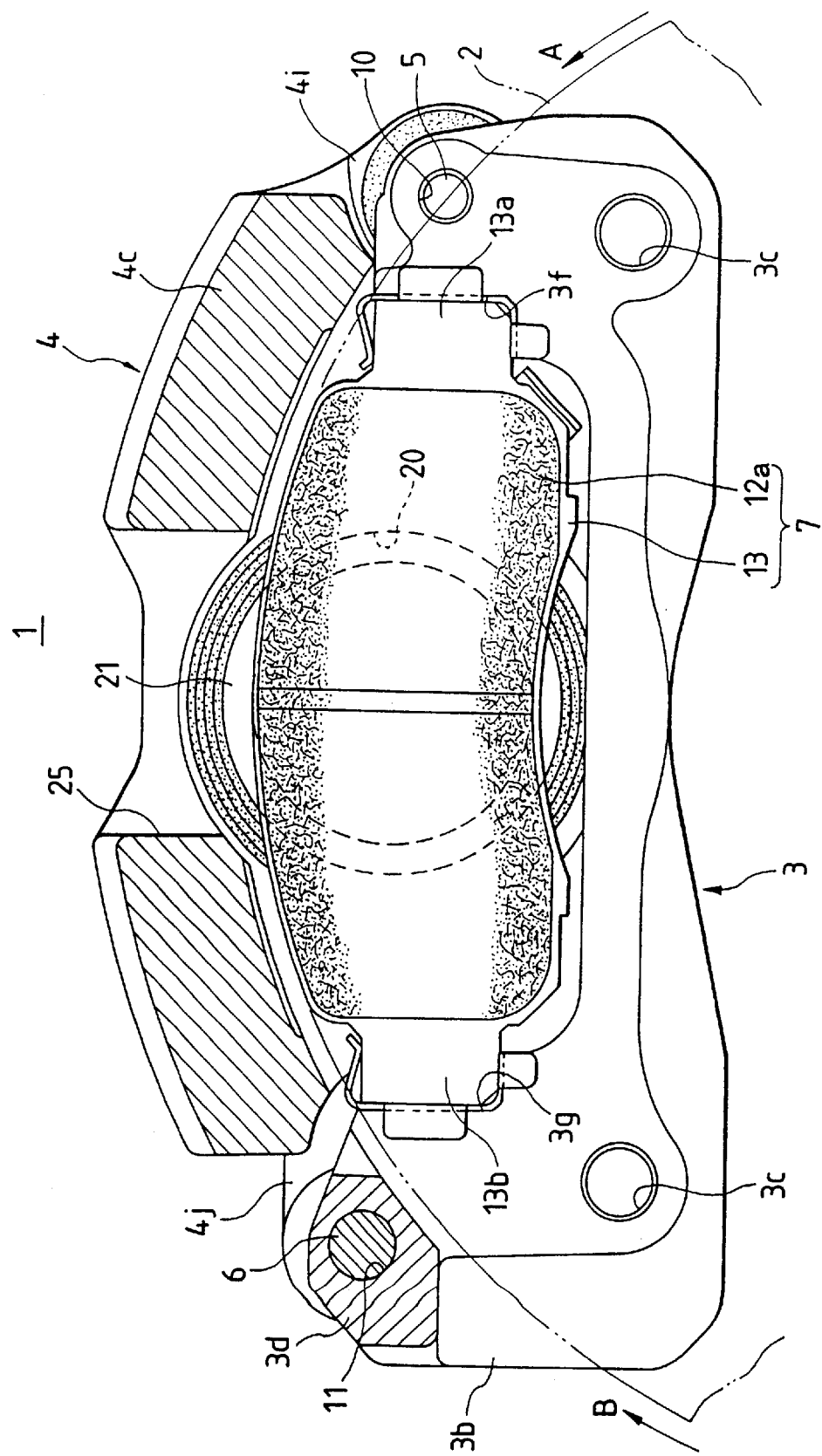
FIG. 11 is a sectional view taken on line XI—XI of FIG. 10.

FIG. 7 shows a third embodiment of the invention being the modification of the second embodiment. In the third embodiment, in view of the moldability of the caliper body 4 and the friction pad 8 as well as post-machining workability, fitting holes 4g and 4h are formed in the respective reaction pawls 4e and 4f of the caliper body 4 as through-holes in the axial direction of a disk, and protrusions 14d and 14e are formed on the back plate 14 of the friction pad 8.

The pad assembling pieces 17b″ and 17b″ of the pad spring 17" are such that their contact pieces 17e″ and 17e″ at their respective end are formed in the shape of a sphere greater in diameter than that of the fitting holes 4g and 4h of the reaction pawls 4e and 4f. When the friction pad 8 on the reacting portion side is temporally assembled with the caliper body 4, the contact pieces 17e″ and 17e″ are brought into resilient contact with the outer-surface openings of the fitting holes 4g and 4h so as to close the fitting holes 4g and 4h. Simultaneously, the inside and outside of the reaction pawls 4e and 4f are held by the back plate 14 and the pad assembling pieces 17b″ and 17b″, and further the contact piece 17e″ of the spring piece 17c″ is brought into resilient contact with the upper bottom wall of the piston receiving recess 24 between the reaction pawls 4e and 4f. Thus, the friction pad 8 is temporarily assembled on the caliper body 4.

In the third embodiment of the present invention, by making use of the contact pieces 17e″ and 17e″ of the pad assembling pieces 17b″ and 17b″, the outer-surface openings of the fitting holes 4g and 4h are closed with the respective contact pieces 17e″ and 17e″. Accordingly, earth and sand, dust, moisture and the like are prevented from entering the fitting holes 4g and 4h. Moreover, the fitting holes 4g and 4h, and the protrusions 14d and 14e are also prevented from being dried and caked with earth and sand and further fretted with rust. Further, the friction pad 8 on the reacting portion side becomes hardly slipped off the caliper body 4 by allowing the contact pieces 17e″ and 17e′ of the pad assembling pieces 17b″ and 17b′ to fall into the outer-surfaces of the fitting holes 4g and 4h.

Although a description has been given of a case where the reverse pin is disposed on the rotor-in side while the vehicle is traveling forward and the collect pin on the rotor-out side while the vehicle is traveling forward, it is only needed for the caliper body to be of any pin slide type, and the slide pin is not restrictive to a specific type.

The protrusions and the fitting holes for use in mating the friction pad on the reacting portion side with the reacting portion of the caliper body may be arranged differently in that protrusions are provided in the reacting portion of the caliper body and fitting holes are bored in the friction pad on the reacting portion side. The fitting hole may be a closed-end hole that is not passed through the back plate of the reacting portion of the caliper body or the back plate of the friction pad.

Further, the reacting portion of the caliper body may be in such a form as to have no reaction pawls wherein it has no reaction pawls. In this case, the spring piece of the pad spring may be urged in a direction in which the caliper body and the friction pad on the reacting portion side are separated from each other inwardly and outwardly in the radial direction of the disk by inserting the spring piece of the pad spring into a recess formed in the reacting portion or otherwise fixedly engaging the that piece with the side of the reacting portion inwardly in the radial direction of the disk.

As set forth above, according to the second and third embodiments of the invention, the invention has the effect of improving the workability of assembling the friction pad with the caliper body as the friction pad temporarily assembled with the reacting portion side of the caliper body can be prevented from slipping off at random when the caliper body is assembled with the caliper body. Since the friction pad on the reacting portion side can be supported by the caliper bracket in the rotor-out side, even when the resilient force is not so much applied to the spring force of the pad spring, the backlash of the caliper body and the friction pad on the reacting portion side due to the travel vibration of the vehicle with respective discrete oscillation frequencies in the radial direction of the disk is suppressed as much as possible. Thus, the protrusion is restrained from prying open the fitting hole with the effect of preventing these from being worn out and producing backlash sound.

Although the spring piece of the pad spring is resiliently urged to the caliper body outwardly in the radial direction of the disk or urged the friction pad on the reacting portion side inwardly in the radial direction of the disk, the amount of movement of the caliper body outwardly in the radial direction of the disk due to the resilient force of the spring piece stays in a range of clearance until the protrusion on the rotor-in side is brought in contact with the inner wall of the fitting hole. Accordingly, the tilting of the caliper body is restrained as small as possible, which results in hardly causing the partial wear of the lining 12b as well as the brake judder without impairing the sliding properties of the caliper body 4.

Further, the outer opening of each fitting hole is covered with the pad assembling piece by utilizing the pad assembling piece of the pad spring whereby to prevent earth and sand, dust, moisture and the like from entering the fitting hole. And, the protrusion and the fitting hole are also prevented from being dried and caked with earth and sand and further fretted with rust. Moreover, the friction pad on the reacting portion side becomes hardly detached from the caliper body by falling part of the pad assembling piece into the outer opening of the fitting hole.

The present invention relates to the subject matter contained in Japanese patent application Nos. Hei.10-270051 filed on Sep. 24, 1998 and Hei.10-272817 filed on Sep. 28, 1998 which are expressly d herein by reference in its entirety.

What is claimed is:

1. A vehicular disk brake, comprising:

a disk rotor;

a caliper bracket fixed to a vehicle body on one side of said disk rotor;

a caliper body having an acting portion and a reacting portion which are disposed opposite to each other in the both sides of said disk rotor, and a bridge portion coupling said acting portion and said reacting portion in such a manner as to stride over the outside of the disk rotor, said reacting portion of said caliper body having a protrusion or a fitting hole;

a pair of slide pins provided in both ends of said caliper body in a radial direction of said disk rotor so that said caliper body is movably supported in an axial direction of said disk rotor; and a pair of friction pads oppositely disposed between said acting and reacting portions of said caliper body in such a manner that said disk rotor is intervened therebetween, said friction pad on a reacting portion side having one of said protrusion or said fitting hole so as to fit with said reacting portion of said caliper body, wherein the braking torque generated in the friction pad of the reacting portion side in the direction in which a vehicle travels forward is rotatably supported and is transmitted directly to said caliper bracket, the braking torque generated in said friction pad on an acting portion side in the direction in which the vehicle moves backward and forwards is rotatably supported by said caliper bracket, and the braking torque generated in said friction pad on the reacting portion side in the direction in which the vehicle moves backward is rotatably supported by said reacting portion of said caliper body by fitting said protrusion to said fitting hole.

2. A vehicular disk brake according to claim 1, wherein said protrusion and said fitting hole are disposed on a rotor-in side in a state that the vehicle is traveling forward.

3. A vehicular disk brake according to claim 2, wherein said fitting hole is larger in diameter than said protrusion, and said fitting hole and said protrusion are brought into contact with each other at an intersection point of a circle having a center coaxial with a rotation center of said disk rotor and passing through the center of said fitting hole, with a surface of a wall on the rotor-in side of the fitting hole in the state that the vehicle is traveling forward.

4. A vehicular disk brake according to claim 1, further comprising:

a pad spring secured to a back plate of said friction pad on the reacting portion side, said pad spring having:

a pad assembling piece brought into resilient contact with an outside surface of said reacting portion so as to attach said friction pad of the reacting portion side to said reacting portion of said caliper body by interposing the inside and the outside surfaces of said reacting portion with said back plate of said friction pad of the reacting portion side and said pad assembling piece of said pad spring; and a spring piece resiliently pushing said friction pad on the reacting portion side and said caliper body in the radial direction of said disk rotor.

5. A vehicular disk brake according to claim 4, wherein said fitting hole is a through-hole formed in said reacting portion of said caliper body and directed in the axial direction of said disk rotor, and an opening of said fitting hole formed in the outside surface of said reacting portion is covered with said pad assembling piece.

6. A vehicular disk brake, comprising:

a disk rotor;

a caliper bracket fixed to a vehicle body on one side of said disk rotor;

a caliper body having an acting portion and a reacting portion which are disposed opposite to each other in the both sides of said disk rotor, and a bridge portion coupling said acting portion and said reacting portion in such a manner as to stride over the outside of the disk rotor, said reacting portion of said caliper body having a protrusion or a fitting hole;

a pair of slide pins provided in both ends of said caliper body in a radial direction of said disk rotor so that said caliper body is movably supported in an axial direction of said disk rotor;

a pair of friction pads oppositely disposed between said acting and reacting portions of said caliper body in such a manner that said disk rotor is intervened therebetween, said friction pad on a reacting portion side having the other of said protrusion or said fitting hole so as to fit with said reacting portion of said caliper body, said protrusion and said fitting hole being disposed on a rotor-in side in a state that the vehicle is traveling forward; and a pad spring secured to a back plate of said friction pad on the reacting portion side, said pad spring having:

a pad assembling piece brought into resilient contact with an outside surface of said reacting portion so as to attach said friction pad of the reacting portion side to said reacting portion of said caliper body by interposing an inside and the outside surfaces of said reacting portion with said back plate of said friction pad of the reacting portion side and said pad assembling piece of said pad spring; and a spring piece resiliently pushing said friction pad on the reacting portion side and said caliper body in the radial direction of said disk rotor, wherein a braking torque generated by the friction pad of the reacting portion side is transmitted directly to the caliper bracket in the forward direction.

7. A vehicular disk brake according to claim 6, wherein said fitting hole are a through-hole formed in said reacting portion of said caliper body and directed in the axial direction of said disk rotor, and an opening of said fitting hole formed in the outside surface of said reacting portion is covered with said pad assembling piece.

8. A vehicular disk brake according to claim 6, wherein said friction pad of the reacting portion side in a rotor-out side in a state that the vehicular is traveling forward is supported to said caliper bracket.

9. A vehicular disk brake according to claim 6, wherein said spring piece resiliently pushes said friction pad on the reacting portion side inwardly in the radial direction of said disk rotor, and resiliently pushes said caliper body outwardly in the radial direction of said disk rotor.

10. A vehicular disk brake, comprising:

a disk rotor;

a caliper bracket fixed to a vehicle body on one side of said disk rotor;

a caliper body having an acting portion and a reacting portion which are disposed opposite to each other in the both sides of said disk rotor, and a bridge portion coupling said acting portion and said reacting portion in such a manner as to stride over the outside of the disk rotor, said reacting portion of said caliper body having at least one protrusion or at least one fitting hole;

a plurality of arms extending outwardly from the caliper bracket;

a plurality of torque-receiving stepped portions corresponding to said plurality of arms;

a pair of slide pins provided in a first and second arm of said plurality of arms in a radial direction of said disk rotor so that said caliper body is movably supported in an axial direction of said disk rotor; and a pair of friction pads oppositely disposed between said acting and reacting portions of said caliper body in such a manner that said disk rotor is intervened therebetween, said friction pad on said acting portion side having a first lug projecting from a back plate on the rotor-out side, said friction pad on said reacting portion side having a second lug projecting from a back plate and the other of said protrusion or said fitting hole so as to fit with said reacting portion of said caliper body, wherein said first lug is rotatably supported by one of the torque-receiving stepped portions and said second lug is supported by another of said torque-receiving stepped portions such that the braking torque generated in the pair of friction pads in the direction in which the vehicle travels forward is rotatably supported by said caliper bracket, and wherein a braking torque generated by the friction pad of the reacting portion side is transmitted directly to the caliper bracket in the forward direction.

11. A vehicular disk brake according to claim 10, further comprising:

a caliper supporting arm striding over an outside of the disk rotor and attached to and extended from one of the plurality of arms, wherein the plurality of arms extending outwardly from the caliper body are three arms;

the plurality of torque-receiving stepped portions are at least three torque-receiving stepped portions, and the another of said torque-receiving stepped portions extends from the leading end of the caliper supporting arm.

12. A vehicular disk brake according to claim 11, wherein said caliper supporting arm is provided between said second arm and a third arm and a closed-end pin hole parallel to a disk axis of said disk rotor is formed in said caliper supporting arm positioned outwardly in them radial direction of said disk rotor further than an outer peripheral edge of the disk rotor.

13. A vehicular disk brake according to claim 12, wherein said pin hole is opened in one side of said disk rotor.

14. A vehicular disk brake according to claim 11, further comprising internal threaded holes bored in bases of said first arm and said second arm for fitting said caliper bracket to the vehicle body.

15. A vehicular disk brake according to claim 11, wherein a first arm and a second arm of said plurality of arms are juxtaposed to each other and are positioned outwardly in the radial direction from said disk rotor on the rotor-in and rotor-out sides during the forward traveling of the vehicle.

16. A vehicular disk brake according to claim 10, further comprising:

a pair of reaction pawls formed on the caliper body; and said at least one fitting hole being a first and second fitting hole passing through the respective reaction pawls, wherein said first fitting hole is larger in diameter than a respective one of said protrusion within said first fitting hole, said first fitting hole and said respective protrusion are brought into contact with each other at an intersection point of a circle having a center coaxial with a rotation center of said disk rotor and passing through a center of said first fitting hole.

17. A vehicular disk brake according to claim 16, wherein said first fitting hole and said second fitting hole are off set by a length of L1 in a radial direction of the disk rotor;

said first fitting hole is made closer to a center line of the caliper body than said second fitting hole; and a pitch of said protrusions of said friction pad on said reacting portion side is set longer than a pitch of said first and second fitting holes, said first fitting hole and said respective protrusion on the rotor-in side of the friction pad of said reacting portion side are brought into contact with each other at an intersection point P of the circumference C drawn by a radius R passing through a center of said first fitting hole and having a center of rotation of the disk rotor as a fulcrum with a wall surface on the rotor-in side of said first fitting hole.

18. A vehicular disk brake according to claim 10, further comprising a judder preventing shim plate engaging with said friction pad on said reacting portion side.

* * * * *